(12) United States Patent
Shimazu

(10) Patent No.: US 6,244,169 B1
(45) Date of Patent: Jun. 12, 2001

(54) AUTOMATIC APPARATUS FOR MAKING ROLLED SUSHI

(76) Inventor: Yoshinori Shimazu, c/o Kabushiki Kaisha Shimazukikaiseisakusho, of 7-7, Mitejima 1-Chome, Nishiyodogawa-ku, Osaka City, Osaka (JP)

( * ) Notice: Subject to any disclaimer, the term of this patent is extended or adjusted under 35 U.S.C. 154(b) by 0 days.

(21) Appl. No.: 09/627,369

(22) Filed: Jul. 28, 2000

(51) Int. Cl.[7] ............................ A23P 1/00; A22C 7/00
(52) U.S. Cl. ............ 99/450.2; 99/450.1; 99/450.6; 99/450.7; 99/494; 425/112; 425/308; 425/297; 425/383; 425/371
(58) Field of Search ............ 99/485, 353, 428, 99/450.1–450.7, 494; 425/182, 193, 204, 225, 297, 358, 327, 408, 412, 308, 383, 110, 112, 315; 426/272, 512, 513

(56) References Cited

U.S. PATENT DOCUMENTS

| | | | |
|---|---|---|---|
| 4,437,826 | * 3/1984 | Tezuka | 425/308 X |
| 4,548,571 | * 10/1985 | Suzuki | 99/450.1 X |
| 4,552,523 | * 11/1985 | Suzuki | 99/485 X |
| 4,556,379 | * 12/1985 | Ikishima | 425/308 X |
| 4,597,731 | * 7/1986 | Suzuki | 426/512 X |
| 4,637,304 | * 1/1987 | Suzuki | 99/450.2 |
| 4,674,967 | * 6/1987 | Oseka | 99/450.1 X |
| 5,381,728 | * 1/1995 | Tateno | 425/112 X |
| 5,482,453 | * 1/1996 | Shimizu | 426/512 X |
| 5,634,396 | * 6/1997 | Isobe et al. | 99/450.6 |
| 5,832,813 | * 11/1998 | Shimazu | 99/450.2 |
| 5,870,948 | * 2/1999 | Ono | 99/450.2 X |
| 5,910,208 | * 6/1999 | Ono | 99/353 |

* cited by examiner

Primary Examiner—Timothy F. Simone
(74) Attorney, Agent, or Firm—Curtis L. Harrington

(57) ABSTRACT

The present invention provides an automatic rolled sushi producing apparatus consisting of a vinegared rice supply unit; a vinegared rice supply conveyer arranged below the vinegared rice supply unit; a carrying conveyer arranged at right angle to the vinegared rice supply conveyer; a vinegared rice extrusion mechanism arranged along an advancing direction of the carrying conveyer; a vinegared rice cutting mechanism; a tight rolling mechanism; a forming mechanism; a product extrusion mechanism; and a product take-out conveyer arranged at right angle to the carrying conveyer at a terminal end of the carrying conveyer, and wherein the vinegared rice supply conveyer, the carrying conveyer and the product take-out conveyer are arranged in the form of U as a whole.

3 Claims, 17 Drawing Sheets

AUTOMATIC APPARATUS FOR MAKING ROLLED SUSHI

BACKGROUND OF THE INVENTION

1. Technical Field of the Invention

The present invention relates to an automatic rolled sushi producing apparatus and the object of the present invention is to provide an automatic rolled sushi producing apparatus which can dispense with a large installation space, can be handled by small number of people, reduce people on production lines, reduce production cost and can obtain beautifully finished rolled sushi with the end faces of the sushi kept from getting out of shape.

2. Prior Art

Conventionally, rolled sushi has been produced by putting cooked, vinegared rice and ingredients on a sheet of laver, rolling the vinegared rice and ingredients with the sheet of laver, pressing them from side to give form and finally cutting up the rolled sushi with a knife. However, if rolled sushi is made by hand, people involved are disadvantageously fatigued with long-time work. Quite naturally, therefore, there is a limit to the mass production of rolled sushi for a long time. In view of these facts, there exist a rolled sushi producing apparatus for producing rolled sushi by spreading a film on a linearly stretched belt conveyer, supplying vinegared rice onto this film, next putting ingredients on the vinegared rice, gradually and continuously pressing and rolling the film on which the vinegared rice and ingredients are being put with a guide plate and a roller, cutting up the rolled film into pieces of a predetermined size with a cutting device and finally removing the film and rolling the vinegared rice and ingredients in a sheet of laver with hand, and an apparatus for producing rolled sushi by supplying a sheet of laver on a conveyer in advance and putting vinegared rice on the sheet of laver. Further, convenience stores often deal in sushi in recent years. For the purpose of shortening time from production to sale as much as possible, foods such as sushi are delivered to the convenience stores three times a day. In these circumstances, the demand of the industry of automatic rolled sushi producing apparatuses is being shifted from providing mass-production large-sized machines capable of producing large amounts of products once to small-sized machines which can be handled with a small number of people.

Nevertheless, according to the conventional rolled sushi producing apparatuses stated above, it takes labor to remove a film and then roll vinegared rice and ingredients in a sheet of laver and it is, therefore, necessary to use many people to carry out this operation. Furthermore, since the conveyer is linearly stretched, a large installation space is required. Either case cannot satisfy the recent demand of the industry. Besides, with the conventional rolled sushi producing apparatuses as stated above, vinegared rice flowing on the conveyer is tight rolled, formed and then cut up. Due to this, the end faces of the rolled sushi easily get out of shape, which is not suitable for providing beautifully finished sushi. Moreover, even if vinegared rice is cut up by fixed amount on the conveyer in advance, the vinegared rice is bonded to a film or a sheet of laver because the apparatus is constituted to supply vinegared rice onto a film or the sheet of layer. As a result, the vinegared rice cannot be cut up on the conveyer by fixed amount. The present invention has been made in view of the above-stated conventional problems and the object of the present invention is to provide an automatic rolled sushi producing apparatus which can dispense with a large installation space, can be handled with a small number of people, reduce production cost and obtain beautifully finished rolled sushi with the end faces of the sushi kept from getting out of shape.

BRIEF SUMMARY OF THE INVENTION

The present invention has been made to solve the above-stated problems. An invention recited in claim 1 is an automatic rolled sushi producing apparatus characterized by comprising a vinegared rice supply unit; a vinegared rice supply conveyer arranged below the vinegared rice supply unit; a carrying conveyer arranged at right angle to the vinegared rice supply conveyer; a vinegared rice extrusion mechanism arranged along an advancing direction of the carrying conveyer; a vinegared rice cutting mechanism; a tight rolling mechanism; a forming mechanism; a product extrusion mechanism; and a product take-out conveyer arranged at right angle to the carrying conveyer at a terminal end of the carrying conveyer, and wherein the vinegared rice supply conveyer, the carrying conveyer and the product take-out conveyer are arranged in the form of U as a whole. An invention recited in claim 2 is an automatic rolled sushi producing apparatus according to claim 1, characterized in that the vinegared rice cutting mechanism comprises a vertical drive mechanism driven vertically toward the carrying conveyer; a cutting blade attached to the vertical drive mechanism; and a longitudinal drive mechanism for driving the cutting blade to reciprocate in a longitudinal direction of the carrying conveyer, and in that a speed for driving the cutting blade forward is set higher than a carrying conveyer advancing speed. An invention recited in claim 3 is an automatic rolled sushi producing apparatus according to claim 1, characterized in that the product extrusion mechanism is formed as a rotating vane mechanism provided with four vanes arranged at right angle to one another; a rotary shaft direction of the rotating vane mechanism is the same as the carrying conveyer advancing direction; the carrying conveyer is formed as a roller feed mechanism having a plurality of rollers aligned at required intervals in the vicinity of the terminal end of the carrying conveyer; each of the vanes consists of a plurality of rod members provided at corresponding intervals to the intervals of rollers.

PREFERRED EMBODIMENTS OF THE INVENTION

Figure 1:
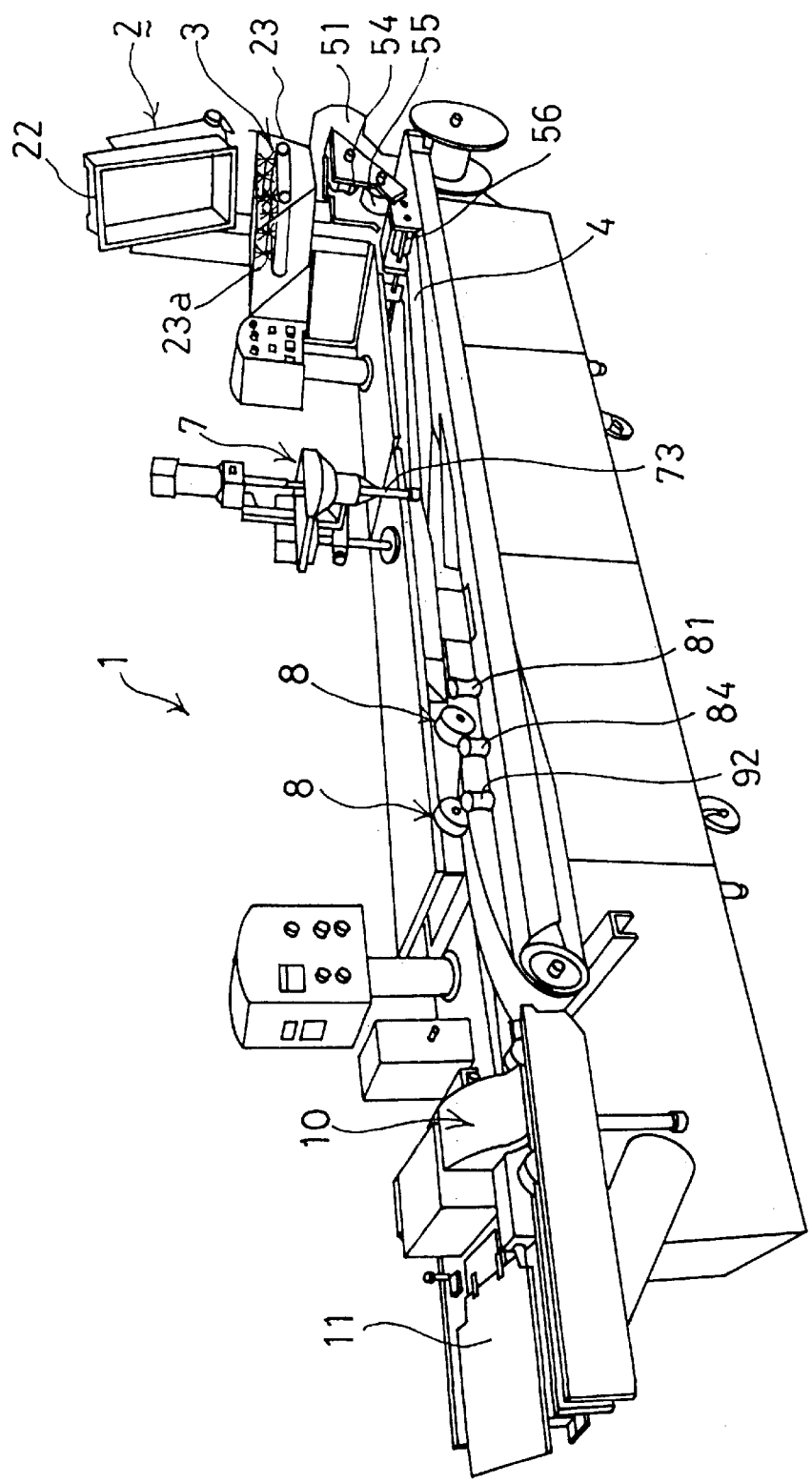
FIG. 1 is a perspective view schematically showing the overall structure of an automatic rolled sushi producing apparatus according to the present invention.
Figure 2:
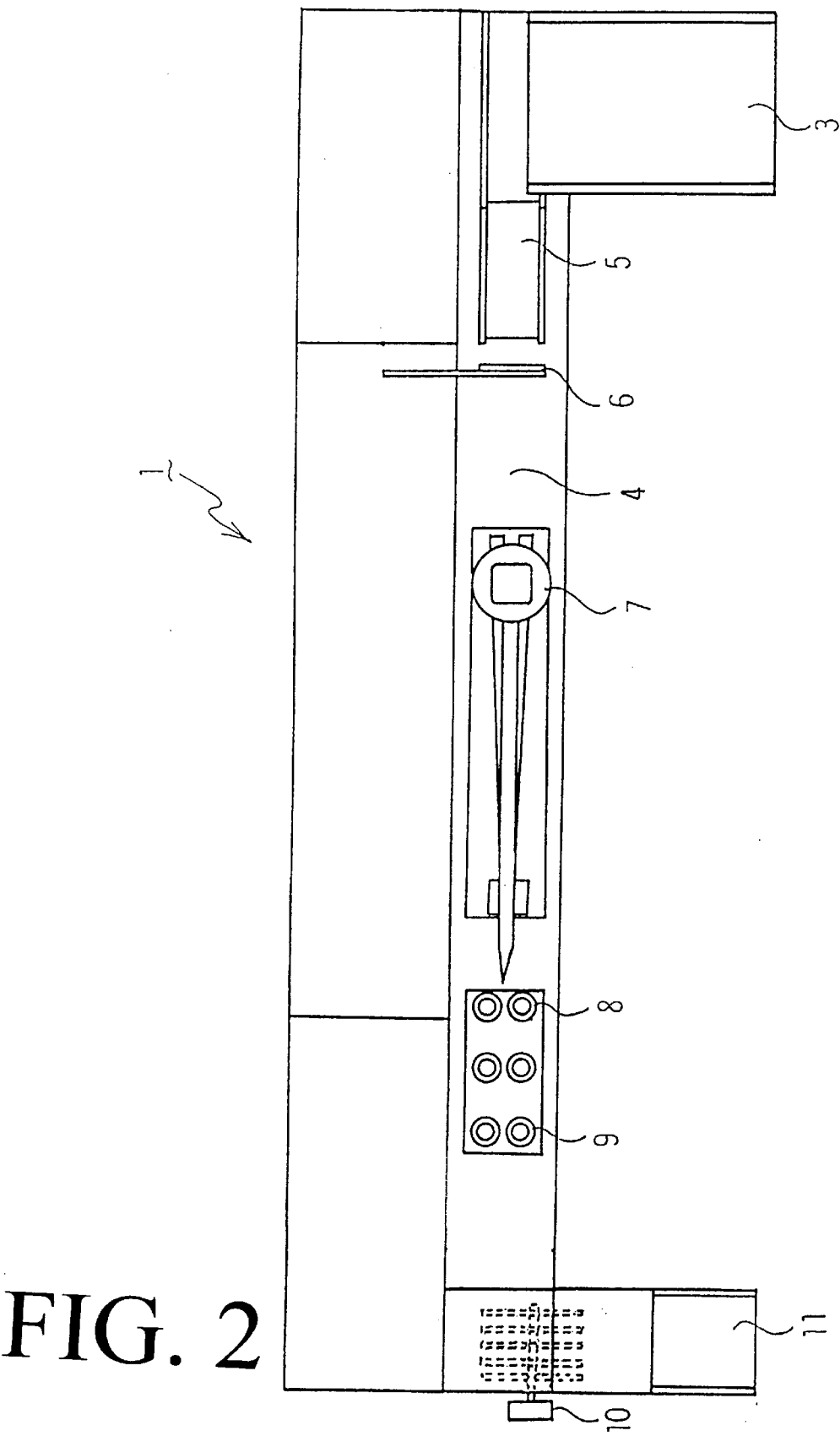
FIG. 2 is a top view schematically showing the overall structure of the automatic rolled sushi producing apparatus according to the present another invention.

A preferred embodiment of an automatic rolled sushi producing apparatus according to the present invention will be described hereinafter based on the drawings. FIG. 1 is a perspective view schematically showing the overall structure of an automatic rolled sushi producing apparatus according to the present invention and FIG. 2 is a top view of another embodiment. In the automatic rolled sushi producing apparatus (1) shown therein, a vinegared rice supply conveyer (3) is arranged below a vinegared rice supply device (shown in FIG. 3) and a carrying conveyer (4) is arranged at right angle to the vinegared rice supply conveyer (3). Also, a vinegared rice extrusion mechanism (5), a vinegared rice cutting mechanism (6), an ingredient supply mechanism (7), a tight rolling mechanism (8), a forming mechanism (9) and a product extrusion mechanism (10) are sequentially arranged from a starting end side in the advancing direction of the carrying conveyer (4) in this order. A product take-out conveyer (11) is arranged at right angle to the conveyer (4) on the terminal end of the carrying conveyer (4).

Figure 3:
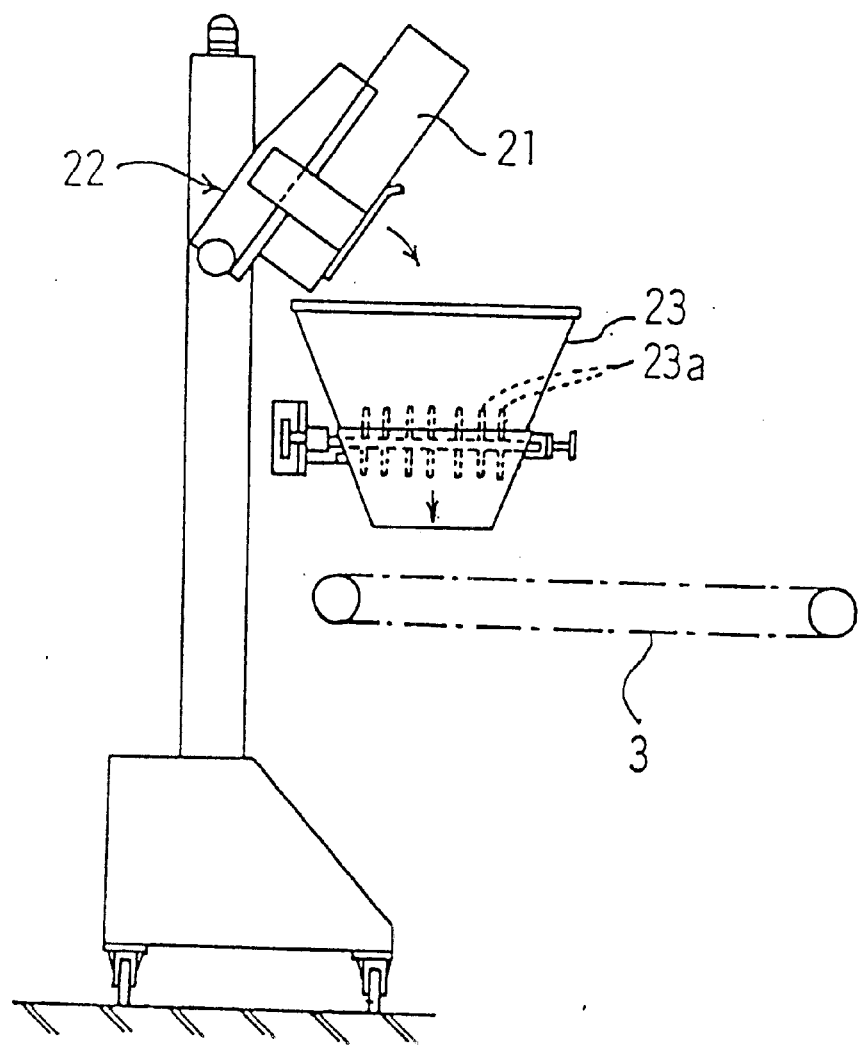
FIG. 3 is a schematic side view showing a vinegared rice supply mechanism.

As shown in FIG. 3, the vinegared rice supply device (2) consists of a bat (21) in which vinegared rice is contained, a bat reverser (22) and a vinegared rice supply hopper (23) having therein a rotating and loosening mechanism with a plurality of rod-like loosening vanes (23a). Below the vinegared rice supply hopper (23), the vinegared rice supply conveyer (3) is arranged.

Figure 4:
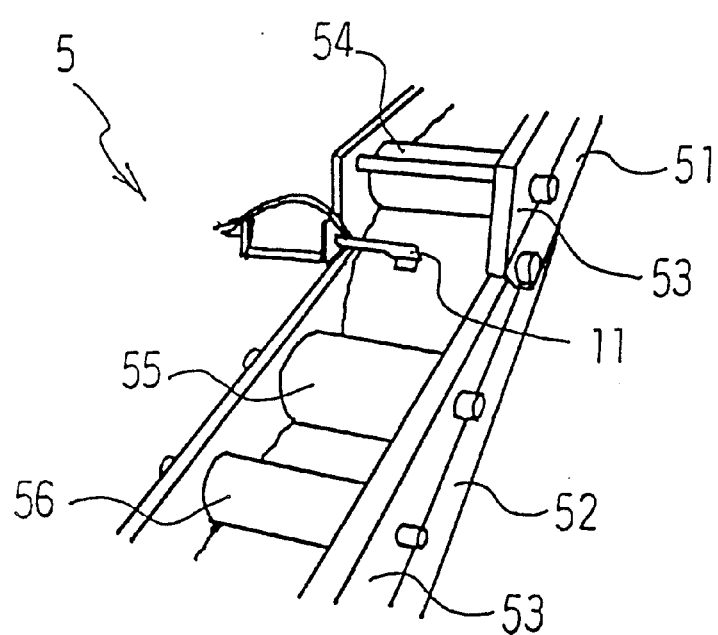
FIG. 4 is a perspective view of a vinegared rice extrusion mechanism.

The vinegared rice extrusion mechanism (5) includes the first belt conveyer (51) and the second belt conveyer (52) provided below the first belt conveyer (51) and inclined downward toward the carrying conveyer (4). FIG. 4 is a perspective view showing the vinegared rice extrusion mechanism (5). A guide frame plate (53) having an opened lower side is arranged on the sides of the first and second belt conveyers (51) and (52). The first flattening roller (54), the second flattening roller (55) and the third flattening roller (56) are rotatably, pivotally supported by the guide frame plate (53).

Further, a sensor (11) for detecting blocks of vinegared rice is provided between the first flattening roller (54) and the second flattening roller (55). If the vinegared rice is not sufficiently loosened and flows in the form of large blocks, the sensor (11) detects the blocks and stops the apparatus.

Figure 5:
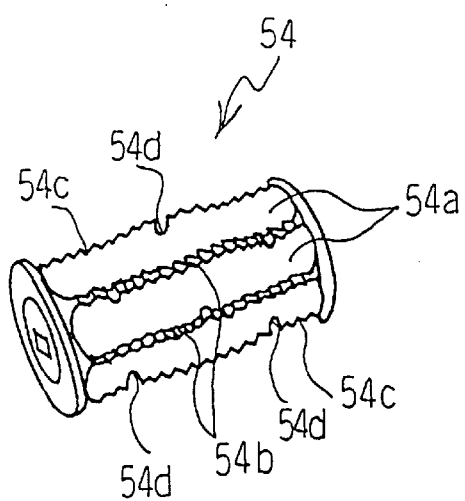
FIG. 5 is a perspective view of the first flattening roller.

As shown in FIG. 5, the first flattening roller (54) includes a plurality of concave portions (54a) formed axially on the outer peripheral surface of the roller (54) at fixed intervals, and a plurality of concave grooves (54c) formed circumferentially in a plurality of convex portions (54b). Some concave grooves are formed as deep concave grooves (54d) at required positions. The deep concave grooves (54d) are constituted so as not to continuously appear at positions different from those formed in adjacent convex portions, i.e., at certain positions on the conveyer when rollers rotate. Further, the convex portions of the first flattening roller (54) are formed to bulge from the axial ends toward the center thereof.

Figure 6:
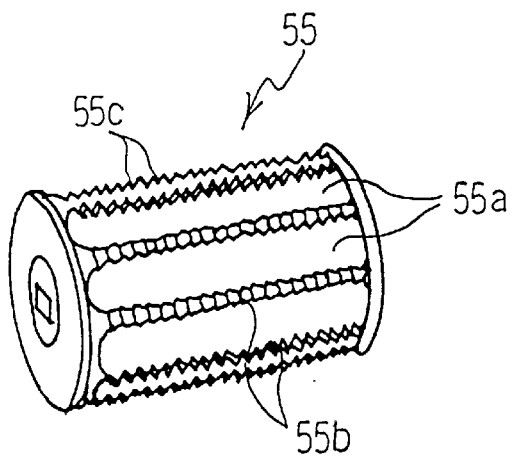
FIG. 6 is a perspective view of the second flattening roller.

As shown in FIG. 6, the second flattening roller (55) includes a plurality of concave portions (55a) formed axially on the outer peripheral surface of the roller (55) at fixed intervals, and a plurality of concave grooves (55c) formed circumferentially in a plurality of convex portions (55b). The concave portions (55a) and the concave grooves (55c) are formed narrower than the concave portions (54a) and the concave grooves (54c) of the first flattening roller (55), respectively.

Figure 7:
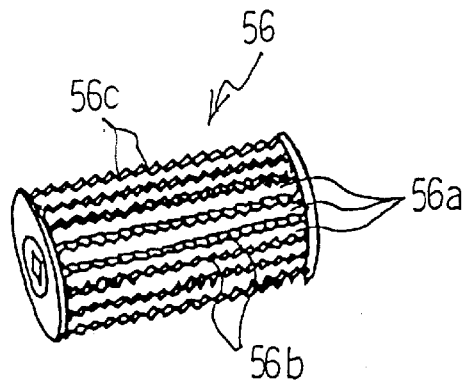
FIG. 7 is a perspective view of the third flattening roller.
Figure 8:
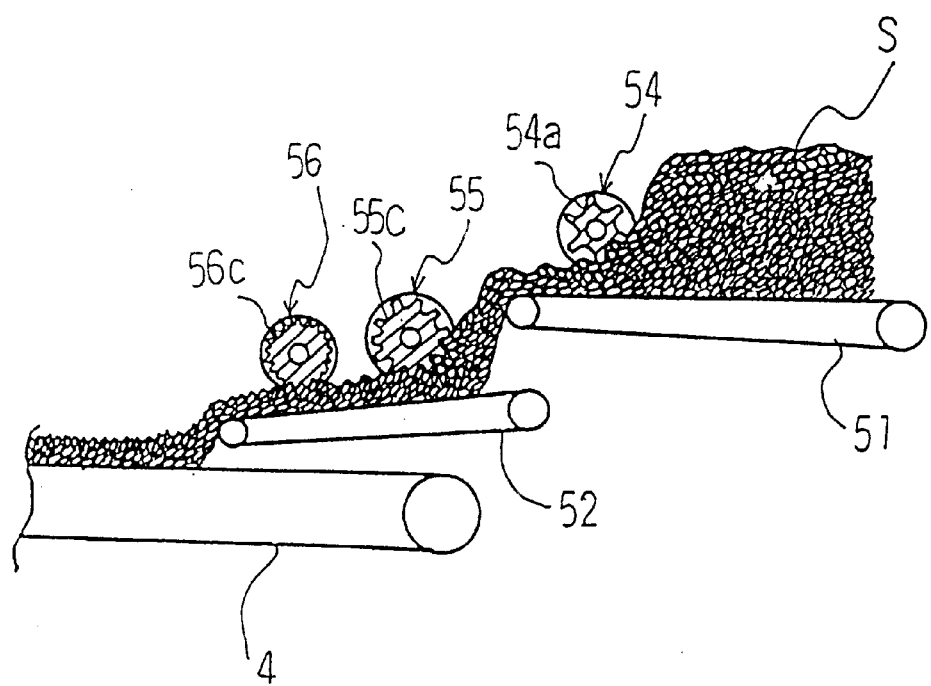
FIG. 8 is an explanatory view for the function of the vinegared rice extrusion mechanism.

As shown in FIG. 7, the third flattening roller (56) includes a plurality of concave portions (56a) formed axially on the outer peripheral surface of the roller (56) at fixed intervals, and a plurality of concave grooves (56c) formed circumferentially in a plurality of convex portions (56b). The concave portions (56a) and the concave grooves (56c) are formed narrower than the concave portions (55a) and the concave grooves (55c) of the second flattening roller (55), respectively.

According to the above-stated vinegared rice extrusion mechanism (5), vinegared rice (S) supplied from the vinegared rice supply conveyer onto the first belt conveyer (51) is first extruded by the first flattening roller (54) onto the second belt conveyer (52) downstream of the first belt conveyer (51), then extruded by the second flattening roller (55) onto the third flattening roller (56) downstream of the second flattening roller (55) and put on and supplied onto the carrying belt conveyer (4). At this moment, on the first flattening roller (54), the vinegared rice (S) is brought into the plural concave grooves (54c) on the outer peripheral surface of the roller (54) and flattened and, at the same time, brought into the plural concave portions (54a). In this state, the rice (S) is extruded downstream. Due to this, the rice (S) is extruded in a state in which the bulge of the rice (S) is maintained. Further, since the deep concave grooves (54d) are constituted so as not to continuously appear at positions different from those formed in the adjacent convex portions (54b), i.e., at certain positions on the conveyer when the roller rotates, vinegared rice, even if flowing on the conveyer in the form of large blocks, can be extruded onto the downstream second belt conveyer (52) in a state in which the blocks of vinegared rice are fully broken and flattened to certain degree. Besides, since the convex portions of the first flattening roller (54) are formed to bulge from the axial ends to the center thereof, it is possible to break and flatten the blocks of the vinegared rice bulging on the central portion more surely.

The vinegared rice (S) extruded onto the second belt conveyer (52) is brought into the plural concave grooves (55c) on the outer peripheral surface of the second flattening roller (55) and flattened and, at the same time, brought in to the plural concave portions (55a) and extruded downstream in a state in which the bulge of the vinegared rice (S) is maintained. Further, the vinegared rice (S) is brought into the plural concave grooves (56c) on the outer peripheral surface of the third flattening roller (56) and flattened and, at the same time, brought into the plural concave portions (56) and then extruded downstream in a state in which the bulge of the vinegared rice (S) is maintained. At this moment, since the concave portions and concave grooves formed in the respective rollers become gradually narrower from the first flattening roller (54) to the second flattening roller (55) and to the third flattening roller (56) in this order, the vinegared rice is gradually flattened every time the rice passes through the respective rollers. By gradually flattening the vinegared rice, the vinegared rice is extruded onto the downstream carrying conveyer (4) in a state in which the bulge of the vinegared rice is maintained without squashing rice.

Figure 9:
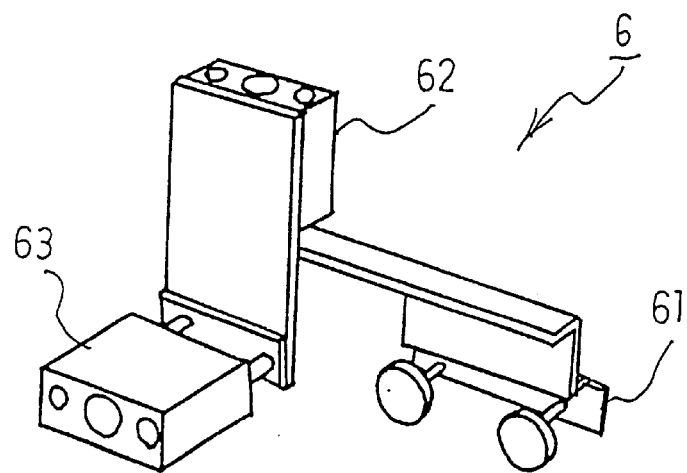
FIG. 9 is a perspective view of a vinegared rice cutting mechanism.
Figure 10:
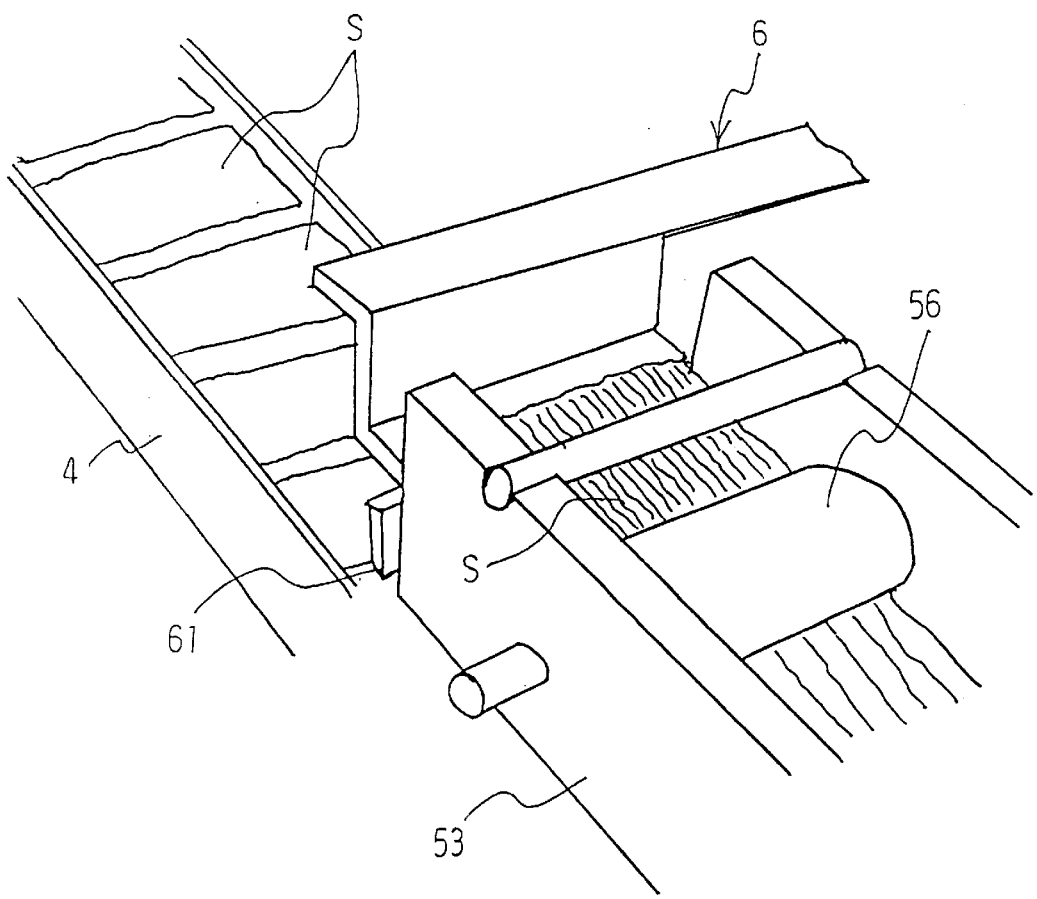
FIG. 10 is a perspective view showing the function of the vinegared rice cutting mechanism.
Figure 11:
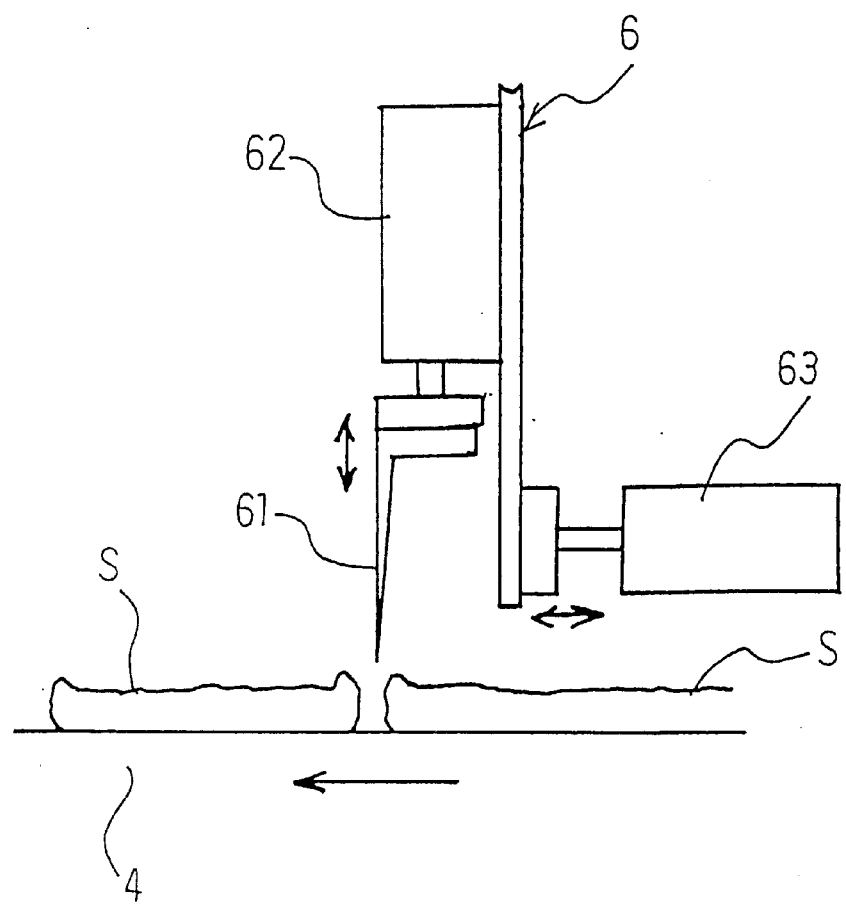
FIG. 11 is an explanatory view for the function of an ingredient supply mechanism.

As shown in FIG. 9, the vinegared rice cutting mechanism (6) consists of a vertical drive mechanism (62) driven vertically, a cutting blade (61) attached to the vertical drive mechanism (62) and a longitudinal drive mechanism (63) for driving the cutting blade (61) to reciprocate in the longitudinal direction of the carrying conveyer (4). As shown in FIG. 10, the mechanism (62) cuts up the vinegared rice (S) extruded after being flattened by the third flattening roller (56) into pieces of a fixed width. A speed for longitudinally driving the cutting blade (61) is set faster than the advancing speed of the carrying conveyer (5), whereby the vinegared rice on the carrying conveyer (4) is cut up into pieces with a fixed width at certain intervals and the cut pieces of the vinegared rice have longitudinal tight ends (see FIG. 11), thus preventing the end portions from getting out of shape when forming the vinegared rice into rolled sushi.

Figure 12:
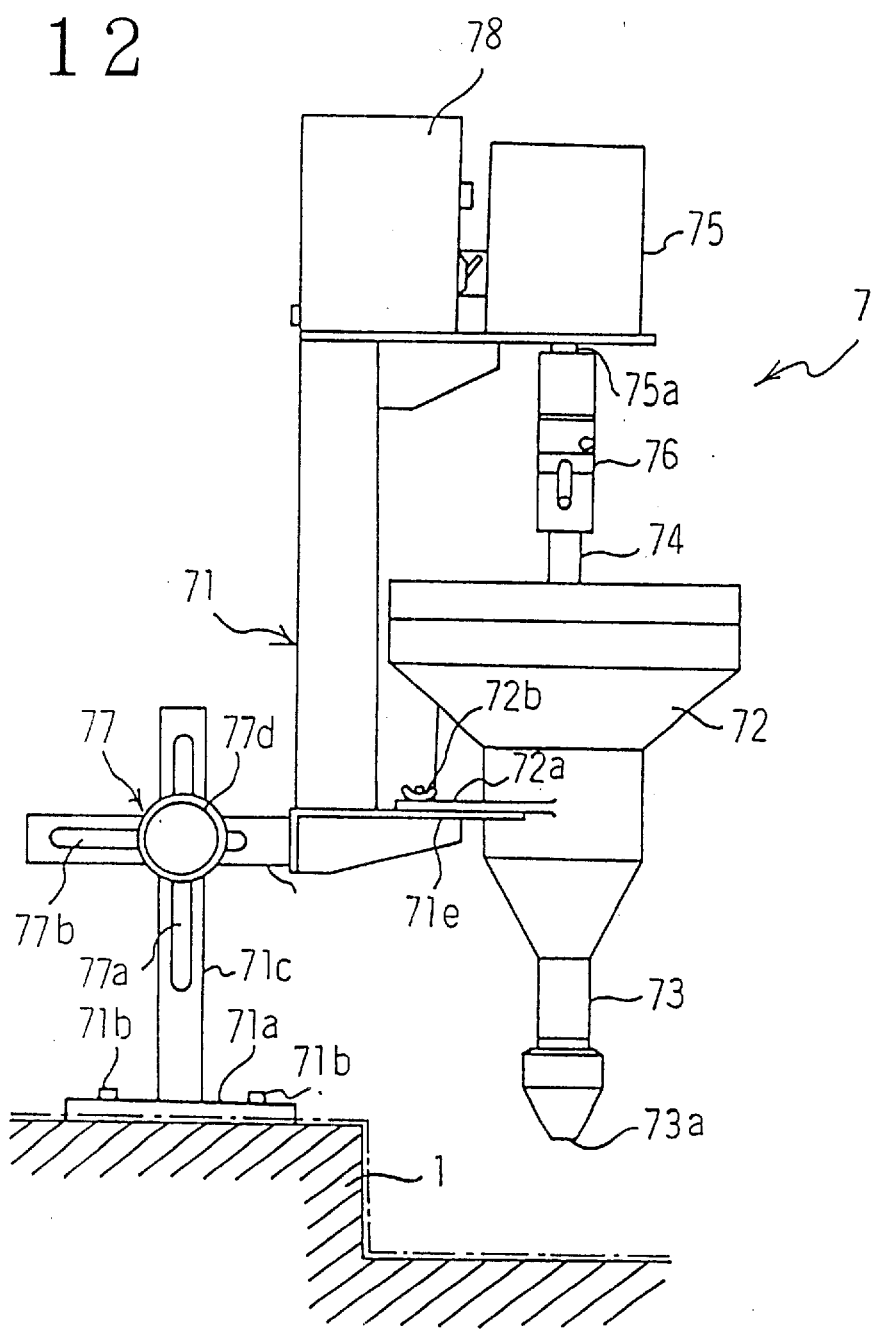
FIG. 12 is a side view of the ingredient supply mechanism.
Figure 13:
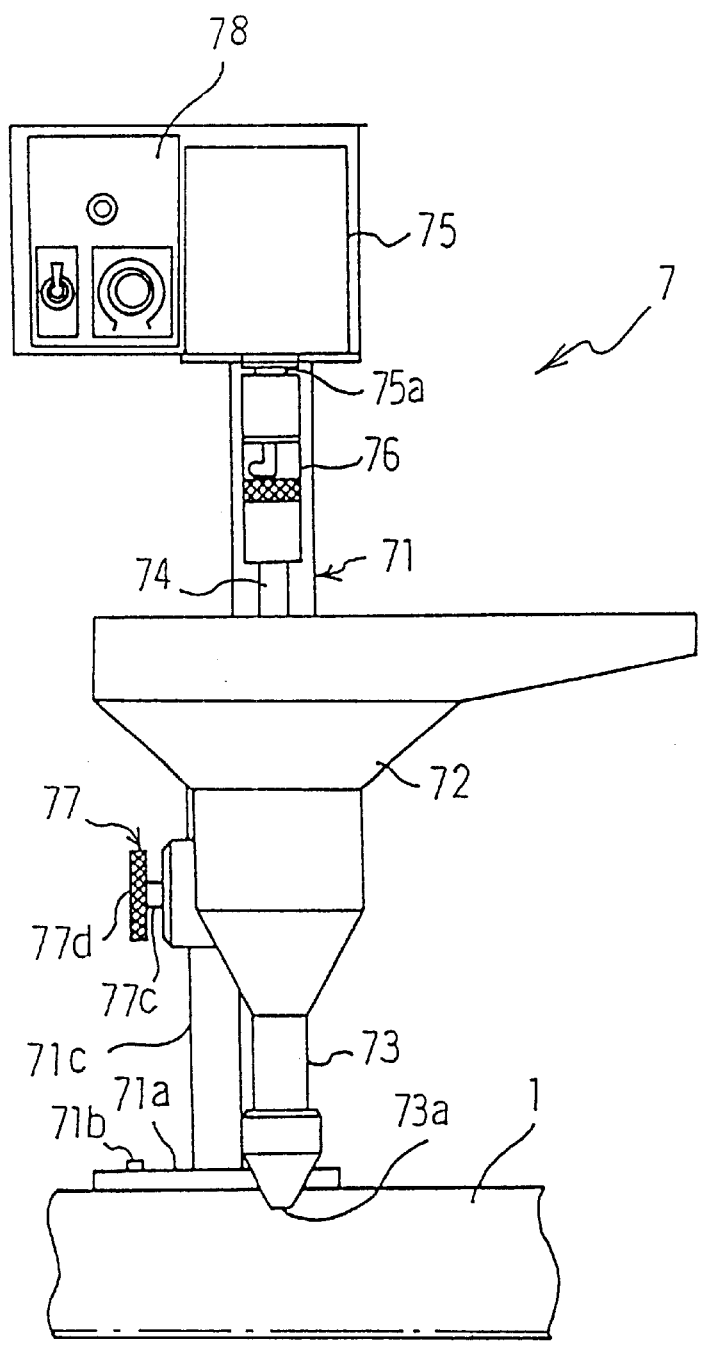
FIG. 13 is a front view of the ingredient supply mechanism.

As shown in FIGS. 12 and 13, the ingredient supply mechanism (7) includes a hopper support mechanism (71), a tapered hopper portion (72) supported by the hopper support mechanism (71), a volumetric supply cylindrical portion (73) almost as long as the hopper portion (72), arranged on the lower end portion of the hopper portion (72) and extended downward therefrom by a predetermined length, an ingredient output nozzle (73a) provided on the lower end of the volumetric supply cylindrical portion (73), an extrusion screw member (74) ranging from the inside of the tapered hopper portion (72) into the volumetric supply cylindrical portion (73), a drive motor (75) for driving the extrusion screw member (74), coupling member (76) for detachably coupling the rotary shaft (75a) of the drive motor (74) with the upper end of the extrusion screw member (74), a position adjustment mechanism (77) provided at the hopper support mechanism (71) and adjusting the vertical and longitudinal positions of the hopper portion (72), and a control board (78) for controlling the rotation speed of the extrusion screw member (74) driven to rotate by the drive motor (75) and the like.

In the hopper support mechanism (71), a support base (71a) is fixedly attached to a producing apparatus main body (1) by a plurality of attachment bolts (71b), a horizontal support rod (71d) is attached, through the position adjustment mechanism (77), to a vertical support rod (71c) provided on the support base (71a), and a horizontal attachment plate portion (72a) formed on the outer peripheral surface of the hopper portion (72) is fixedly but detachably attached to a horizontal plate (71e) on the tip end of the horizontal support rod (71d) by a hinge bolt (72b), to thereby support the hopper portion (72).

The position adjustment mechanism (77) is provided with a longitudinal elongate hole (77a) formed longitudinally with respect to the vertical support rod (71c), a lateral elongate hole (77b) formed horizontally with respect to the horizontal support rod (71d), and a fixed screw (77c) inserted into the longitudinal elongate hole (77a) and lateral elongate hole (77b). A position adjustment knob (77d) is provided on the head of the fixed screw (77c). With this constitution, if the position adjustment knob (88d) is loosened and the horizontal support rod (71d) is vertically moved relatively to the vertical support rod (71c) through the longitudinal elongate hole (77a), the vertical position of the hopper portion (72) is adjusted. If the horizontal support rod (71d) is moved longitudinally relatively to the vertical support rod (71c) through the lateral elongate hole (77b), the longitudinal position of the hopper portion (72) is adjusted.

Figure 14:
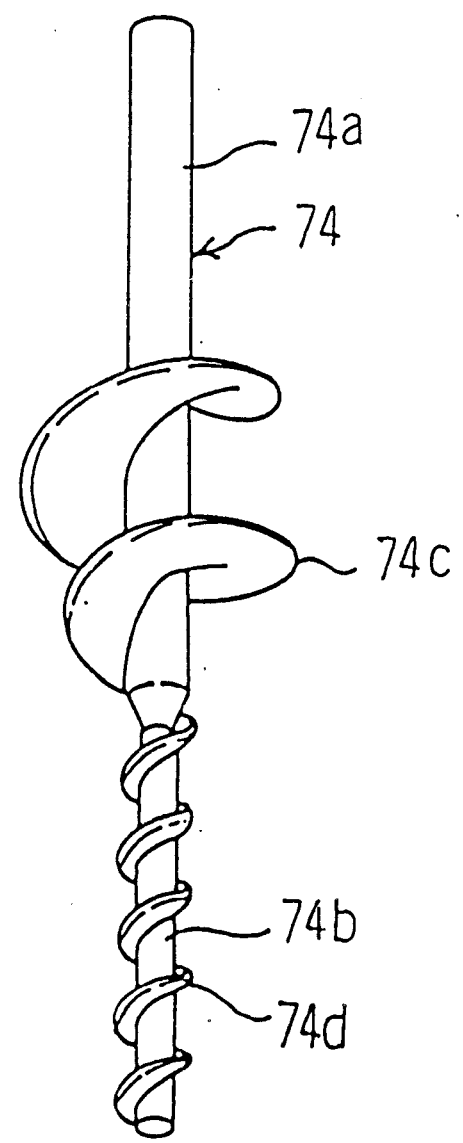
FIG. 14 is a perspective view of the extrusion screw member of the ingredient supply mechanism.

As shown in FIG. 14, the extrusion screw member (74) consists of an upper rod portion (74a), a lower rod portion (74b) provided integrally with the lower end of the upper rod portion (74a) and formed to have a smaller diameter than that of the upper rod portion (74a), the first screw vane (74c) provided on the lower portion-side outer peripheral surface of the upper rod portion (74a), formed to gradually reduce diameter from upper to lower portions and arranged within the hopper portion (72), and the second screw vane (74d) provided on the outer peripheral surface of the small-diameter lower rod portion (74b) and having the same diameter as that of the portion arranged within the volumetric supply cylindrical portion (73). By the rotation of the extrusion screw member (74), the ingredients, such as fermented soybeans, crab meat, tuna fish and mayonnaise, are outputted and supplied onto the surface of the vinegared rice through the volumetric supply cylindrical portion (73) with determined volume at fixed pressure.

The ingredient supply mechanism (7) with the above-stated constitution supplies ingredients onto the vinegared rice on the carrying conveyer. However, the present invention does not necessarily employ the ingredient supply mechanism and ingredients may be put on the vinegared rice with hands depending on the types of the ingredients such as cucumber and kanpyo (dried gourd shavings).

Figure 15:
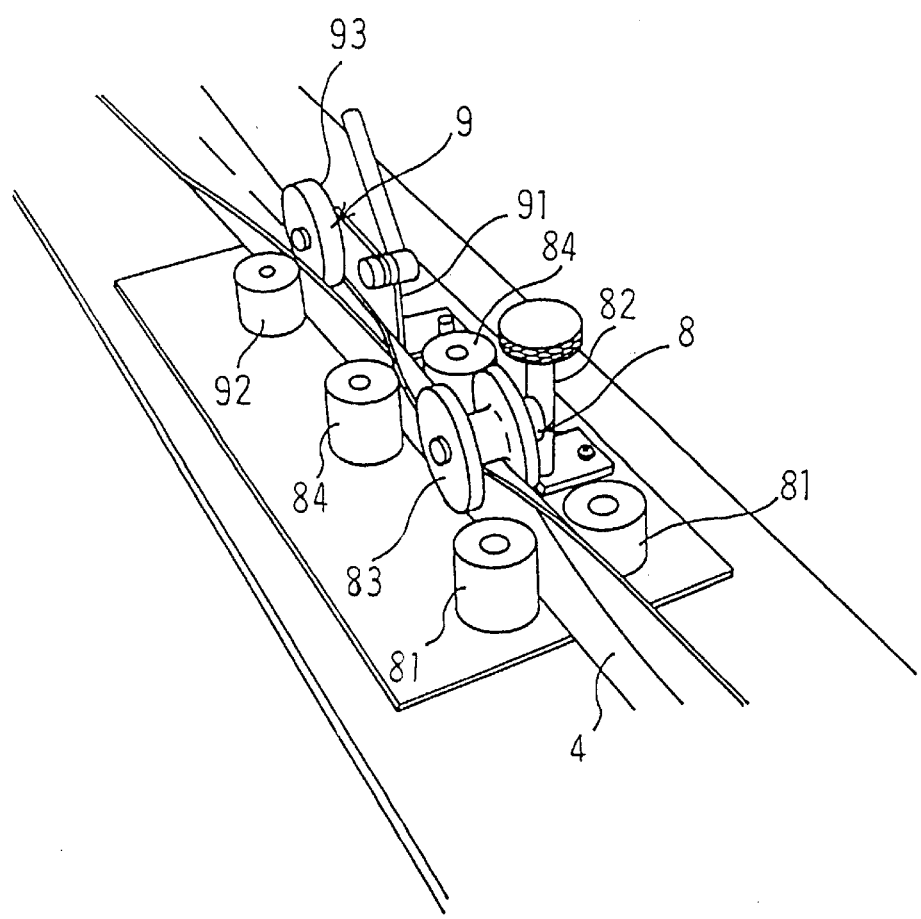
FIG. 15 is a perspective view of a tight rolling mechanism and a forming mechanism.

FIG. 15 shows the tight rolling mechanism (8) and the forming mechanism (9). The tight rolling mechanism (8) is to tight roll the carrying conveyer (4), on which vinegared rice and ingredients are being put, to have a circular cross section. The tight rolling mechanism (8) consists of a pair of right and left vertical press rollers (81) arranged vertically and rotatably and on both upstream sides of the carrying conveyer (4), a horizontal press roller (83) supported horizontally and rotatably by a support member (82) provided downstream of the rollers (81), and a pair of right and left form keeping vertical rollers (84) arranged vertically and rotatably on both sides of the carrying conveyer (4) further downstream.

In addition, the forming mechanism (9) consists of a guide plate (91) arranged on one side of the tight rolling mechanism (8) downstream thereof, a vertical roller (92) arranged at opposite side to the guide plate (91) and holding the carrying conveyer (4) to be tight rolled between the roller (92) and the guide plate (91), and a horizontal forming roller (93) arranged downstream of the guide plate (91) and the vertical roller (92), horizontally, rotatably and pivotally supported onto the rear end portion of the guide plate (91) and forming the vinegared rice put on the carrying conveyer (4) which is gradually returned flat.

The tight rolling mechanism (8) and the forming mechanism (9) form the vinegared rice on which ingredients are put, into a long rolled sushi shape through the carrying conveyer (4). First, the paired right and left vertical press rollers (81) of the tight rolling mechanism (8) raise the both sides of the carrying conveyer (4) on which the vinegared rice is put. The vinegared rice is rolled in the horizontal press roller (82), the vinegared rice integral with the carrying conveyer (4) is rolled tight to have a circular cross section and the tight rolled state is held by the guide plate (91) and the vertical roller (92). When the belt conveyer (4) is returned flat, the vinegared rice is formed into a long rolled sushi shape by the horizontal forming roller (93).

Figure 16:
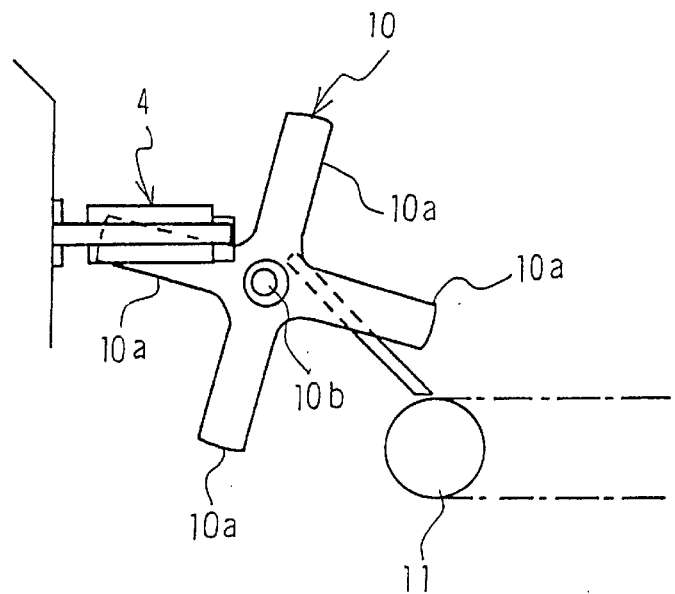
FIG. 16 is a front view of a product extrusion mechanism.
Figure 17:
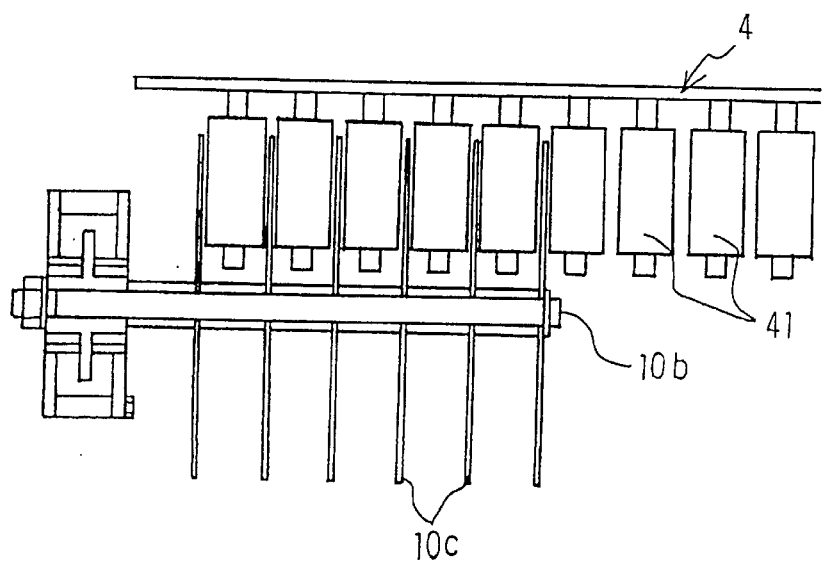
FIG. 17 is a top view of the product extrusion mechanism.
Figure 18:
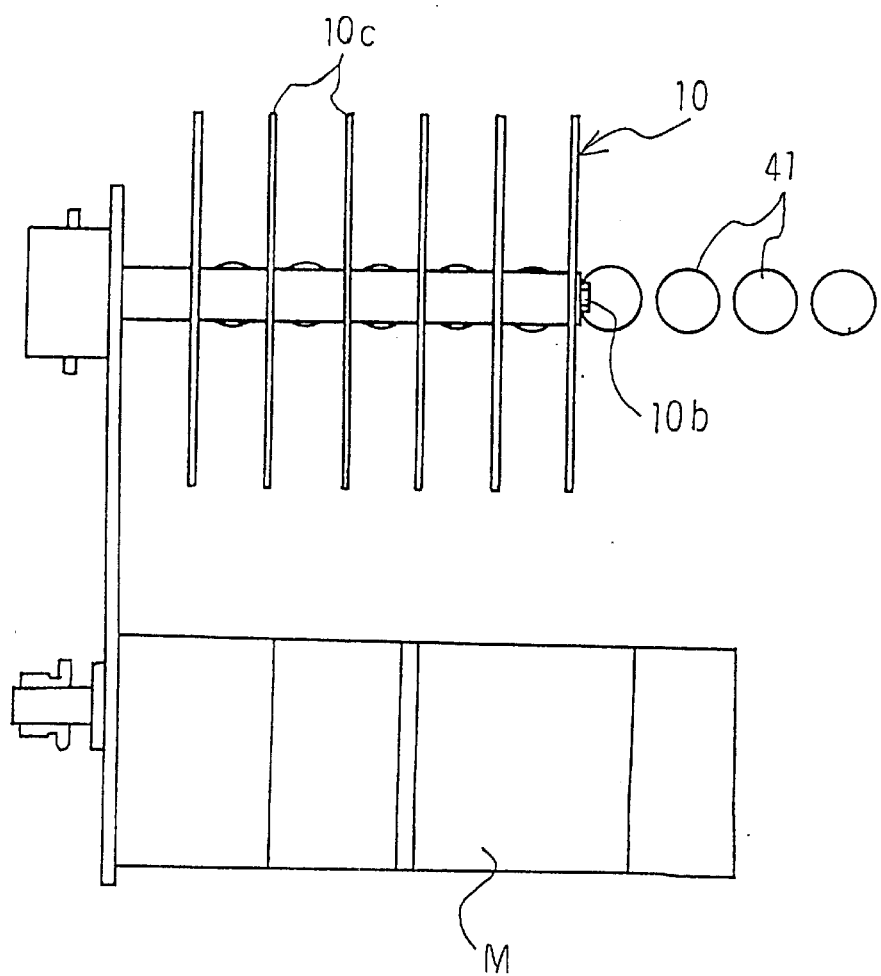
FIG. 18 is a side view of the product extrusion mechanism.

The vinegared rice including the ingredients and formed by the forming mechanism (9) is supplied to the product take-out conveyer (11) by the product extrusion mechanism (10). FIGS. 16 to 18 show the product extrusion mechanism (10). FIG. 16 is a front view, FIG. 17 is a top view and FIG. 18 is a side view thereof. As shown in FIG. 16, the product extrusion mechanism (10) is formed as a rotating vane mechanism having four vanes (10a) arranged at right angle to one another. The rotary shaft (10b) thereof is set in the same direction as the advancing direction of the carrying conveyer (4). Reference symbol (M) denotes a drive motor. By coupling the shaft of this drive motor and the rotary shaft (10b) by a belt or the like, the vanes (10a) rotate.

As shown in FIGS. 17 and 18, the carrying conveyer (4) is formed as a roller feed mechanism having a plurality of rollers (41) aligned in the vicinity of the terminal end thereof at required intervals. By using the vanes of the product extrusion mechanism (10) as a plurality of rod members (10c) provided at intervals corresponding to those of the rollers, the formed vinegared rice flowing on the carrying conveyer (4) (on the rollers) is raised by the rod members (10c) in response to the rotation of the vanes, supplied onto the product take-out conveyer (11) and finally rolled with a sheet of laver, thereby taking out the vinegared rice as a product.

Figure 19:
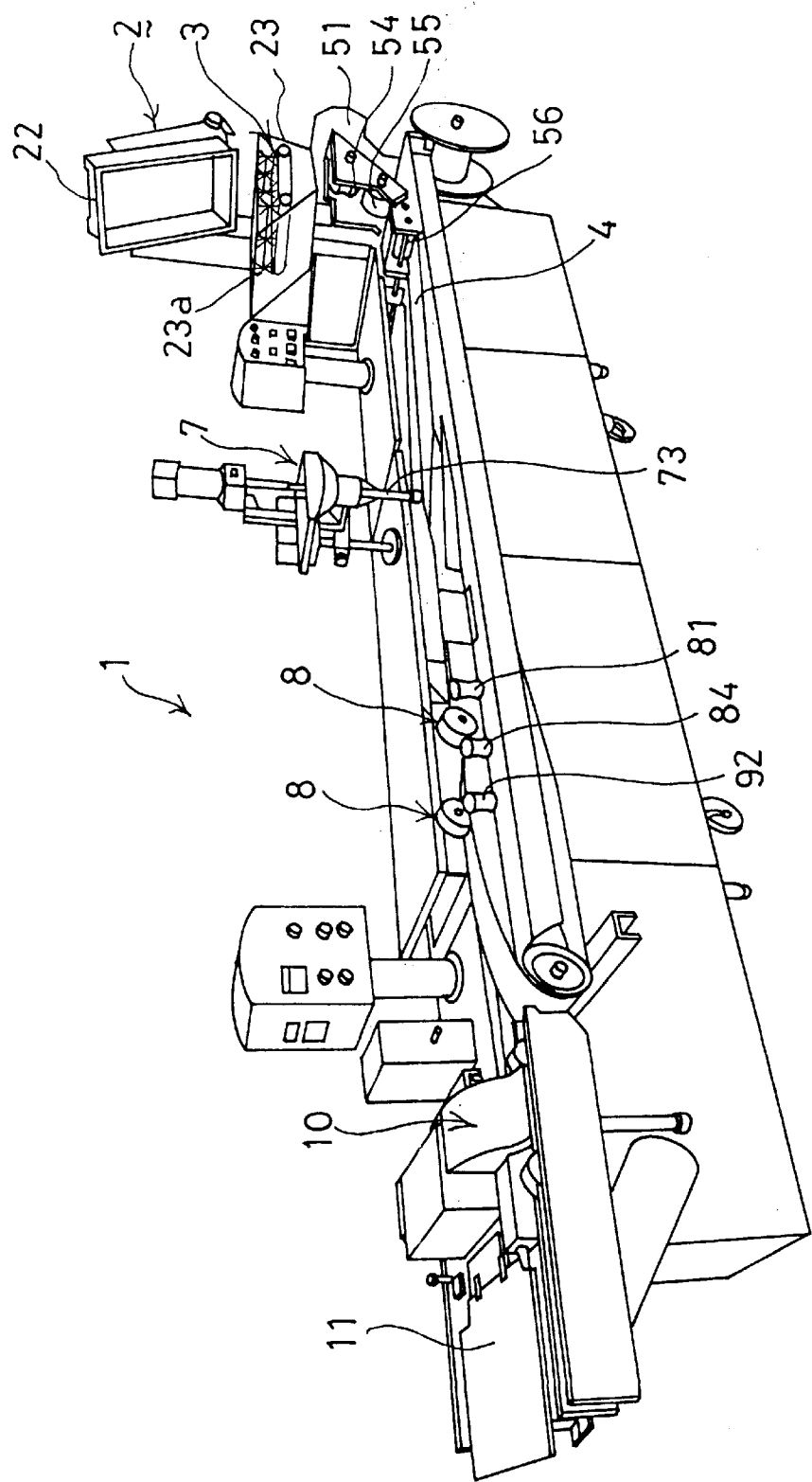
FIG. 19 is a perspective view showing that a vinegared rice cutting mechanism is provided at a difference position in the automatic rolled sushi producing apparatus according to the present invention.
Figure 20:
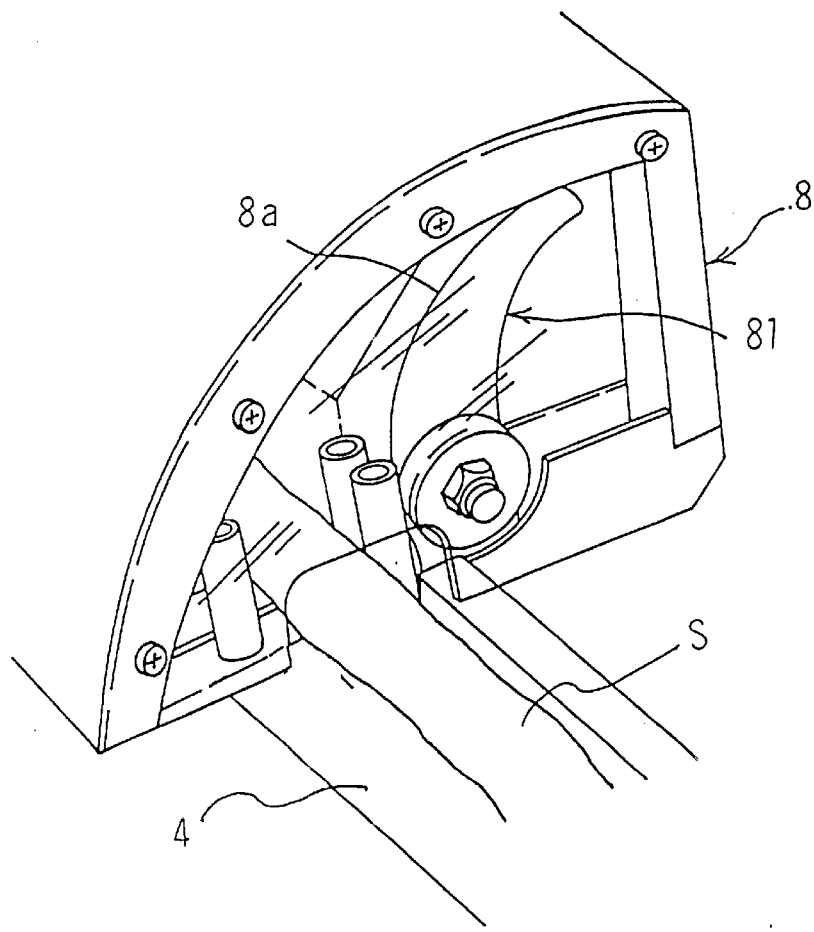
FIG. 20 is a perspective view showing another embodiment of a vinegared rice cutting mechanism.
Figure 21:
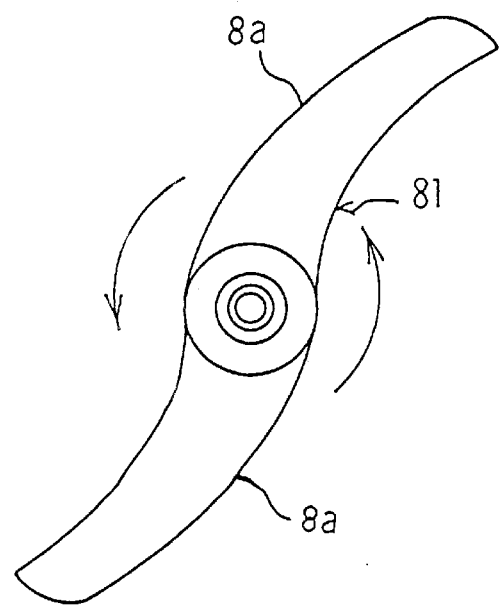
FIG. 21 shows the rotary blade of the vinegared rice cutting mechanism.

In the automatic rolled sushi producing apparatus according to the present invention, the vinegared rice cutting mechanism (6) may be provided not at a position just downstream of the vinegared rice extrusion mechanism (7) but between the forming mechanism (9) and the product extrusion mechanism (10) as shown in FIG. 19. In this case, the vinegared rice cutting mechanism (6) is preferably a rotary blade mechanism as shown in FIG. 20. FIG. 21 shows the rotary blade (81) of the vinegared rice cutting mechanism (6). The mechanism (6) is formed into generally S shape as a whole and a blade (8a) is formed on a vertically curved bulge portion. The rotary blade is driven to rotate by a rotation drive motor (not shown). According to the above-stated vinegared rice cutting mechanism (6), another carrying conveyer is arranged in a gap formed at the terminal end of the carrying conveyer (4) to allow the rotary blade to pass through the gap, thereby cutting up the long rolled sushi (S) formed by the forming mechanism (9) into pieces of a fixed length in response to the rotation of the rotary blade. If this cutting mechanism is used, a sheet of laver may be first supplied on the carrying conveyer, vinegared rice and ingredients may be supplied onto and put on the sheet of laver, rolled with the sheet of laver and formed, and the rolled sushi may be finally cut up by this cutting mechanism.

As stated so far, the invention recited in claim 1 is an automatic rolled sushi producing apparatus, characterized by comprising a vinegared rice supply unit; a vinegared rice supply conveyer arranged below the vinegared rice supply unit; a carrying conveyer arranged at right angle to the vinegared rice supply conveyer; a vinegared rice extrusion mechanism arranged along an advancing direction of the carrying conveyer; a vinegared rice cutting mechanism; a tight rolling mechanism; a forming mechanism; a product extrusion mechanism; and a product take-out conveyer arranged at right angle to the carrying conveyer at a terminal end of the carrying conveyer, and wherein the vinegared rice supply conveyer, the carrying conveyer and the product take-out conveyer are arranged in the form of U as a whole. Thus, the following advantage is obtained.

Since the vinegared rice supply conveyer, the carrying conveyer and the product take-out conveyer are arranged in the form of U as a whole, a large installation space is not required. Also, since there is no need to remove a film and roll a sheet of laver, it is possible to reduce the number of people and production cost.

The invention recited in claim 2 is an automatic rolled sushi producing apparatus according to claim 1, characterized in that the vinegared rice cutting mechanism comprises a vertical drive mechanism driven vertically toward the carrying conveyer; a cutting blade attached to the vertical drive mechanism; and a longitudinal drive mechanism for driving the cutting blade to reciprocate in a longitudinal direction of the carrying conveyer, and in that a speed for driving the cutting blade forward is set higher than a carrying conveyer advancing speed. Thus, the following advantage is obtained.

Since the vinegared rice is not supplied onto a sheet of laver or a film unlike the conventional apparatus, it is possible to cut up the vinegared rice on the conveyer in advance by fixed amount and then supply cut pieces, and to obtain beautifully finished rolled sushi with the end faces thereof kept from getting out of shape. Furthermore, since the vinegared rice can be supplied onto the conveyer as a sheet with a fixed width and a fixed length, it is also possible to supply the rice sheet to the outside of the apparatus and to produce rolled sushi at a difference place. Alternatively, by supplying the rice sheet onto a square sheet of laver and rolling them tight, rolled sushi can be produced. Thus, it is possible to enhance production efficiency.

The invention recited in claim 3 is an automatic rolled sushi producing apparatus according to claim 1, characterized in that the product extrusion mechanism is formed as a rotating vane mechanism provided with four vanes arranged at right angle to one another; a rotary shaft direction of the rotating vane mechanism is the same as the carrying conveyer advancing direction; the carrying conveyer is formed as a roller feed mechanism having a plurality of rollers aligned at required intervals in the vicinity of the terminal end of the carrying conveyer; each of the vanes consists of a plurality of rod members provided at corresponding intervals to the intervals of rollers. Thus, it is possible to easily, surely the formed vinegared rice flowing on the carrying conveyer to the product take-out conveyer arranged at right angle to the carrying conveyer.

What is claimed is:

1. Automatic rolled sushi producing apparatus comprising:

a vinegared rice supply unit:
      a vinegared rice supply conveyer arranged below the vinegared rice supply unit;
      a carrying conveyer arranged at a right angle to the vinegared rice supply conveyer;
      a vinegared rice extrusion mechanism arranged along an advancing direction of the carrying conveyer;
      a vinegared rice cutting mechanism;
      a tight rolling mechanism;
      a forming mechanism;
      a product extrusion mechanism; and a product takeout conveyer arranged at right angle to the carrying conveyer at a terminal end of said carrying conveyer.

2. An automatic rolled sushi producing apparatus according to claim 1, wherein:

said vinegared rice cutting mechanism comprises a vertical drive mechanism driven vertically toward the carrying conveyer; a cutting blade attached to the vertical drive mechanism; and a longitudinal drive mechanism for driving the cutting blade to reciprocate in a longitudinal direction of the carrying conveyer; and a speed for driving the cutting blade forward is set higher than a carrying conveyer advancing speed.

3. An automatic rolled sushi producing apparatus according to claim 1, wherein said product extrusion mechanism is formed as a rotating vane mechanism provided with four vanes arranged at right angle to one another; a rotary shaft direction of the rotating vane mechanism is the same as the carrying conveyer advancing direction; said carrying conveyer is formed as a roller feed mechanism having a plurality of rollers aligned at required intervals in the vicinity of the terminal end of the carrying conveyer; each of said vanes consists of a plurality of rod members provided at corresponding intervals to the intervals of rollers.

* * * * *